(12) United States Patent
Liu

(10) Patent No.: US 10,889,414 B2
(45) Date of Patent: Jan. 12, 2021

(54) FOOD CONTAINER WITH VENTS ON HANDLES

(71) Applicant: FREE-FREE INDUSTRIAL CORP, Taipei (TW)

(72) Inventor: Sheng-Yu Liu, Taipei (TW)

(73) Assignee: FREE-FREE INDUSTRIAL CORP, Taipei (TW)

( * ) Notice: Subject to any disclaimer, the term of this patent is extended or adjusted under 35 U.S.C. 154(b) by 0 days.

(21) Appl. No.: 16/568,245

(22) Filed: Sep. 12, 2019

(65) Prior Publication Data
US 2020/0002062 A1      Jan. 2, 2020

Related U.S. Application Data

(63) Continuation-in-part of application No. 16/426,371, filed on May 30, 2019, which is a continuation of
(Continued)

(30) Foreign Application Priority Data

Sep. 5, 2016   (TW) .............................. 105128688 A

(51) Int. Cl.
*B65D 25/06*      (2006.01)
*B65D 43/16*      (2006.01)
(Continued)

(52) U.S. Cl.
CPC ............ *B65D 43/161* (2013.01); *A47J 47/10* (2013.01); *B65D 25/06* (2013.01);
(Continued)

(58) Field of Classification Search
CPC ................ B65D 51/16; B65D 51/1672; B65D 51/1683; B65D 51/1688; B65D 51/1694; B65D 51/1622; B65D 51/1627; B65D 51/1644; B65D 51/165; B65D 51/1661; B65D 51/1666; B65D 2543/00101; B65D 2543/00379; B65D 2543/00777;
(Continued)

(56) References Cited

U.S. PATENT DOCUMENTS 4,387,551 A * 6/1983 Cowan .............. B29C 66/72341
                                                        156/69
2016/0332785 A1* 11/2016 Sexton .................. B65B 7/2842
(Continued)

*Primary Examiner* — Don M Anderson
(74) *Attorney, Agent, or Firm* — Chun-Ming Shih; HDLS IPR Services

(57) ABSTRACT

A food container with vents on handles includes a box and a cover. The box includes a box wall and a receiving room. Two opposite sides of the box wall are provided with a pair of handle portions. Each handle portion is extended with a bent section from the box wall toward a direction which is bent away from the receiving room. An upper portion of each bent section is formed with a venting space communicating with the receiving room. The cover is removably fastened to the box to cloak the receiving room and includes a cover plate, a pair of handle lids and sliding seals. The handle lids can be fixed to the handle portions to cover the venting space. Each handle lid is provided with vents. The sliding seals are separately disposed in the handle lids to be capable of selectively cloaking the vents.

11 Claims, 11 Drawing Sheets

Related U.S. Application Data application No. 15/377,978, filed on Dec. 13, 2016, now Pat. No. 10,351,311.

(51) Int. Cl.

| | | |
|---|---|---|
| *B65D 81/26* | (2006.01) | |
| *B65D 43/02* | (2006.01) | |
| *B65D 85/34* | (2006.01) | |
| *B65D 85/36* | (2006.01) | |
| *A47J 47/10* | (2006.01) | |
| *B65D 51/16* | (2006.01) | |

(52) U.S. Cl.
CPC ....... *B65D 43/0218* (2013.01); *B65D 81/261* (2013.01); *B65D 81/262* (2013.01); *B65D 85/34* (2013.01); *B65D 85/36* (2013.01); *B65D 51/1683* (2013.01); *B65D 2543/00101* (2013.01); *B65D 2543/00296* (2013.01); *B65D 2543/00379* (2013.01); *B65D 2543/00509* (2013.01); *B65D 2543/00537* (2013.01); *B65D 2543/00555* (2013.01); *B65D 2543/00648* (2013.01); *B65D 2543/00694* (2013.01); *B65D 2543/00777* (2013.01); *B65D 2543/00805* (2013.01)

(58) Field of Classification Search
CPC ...... B65D 47/32; B65D 85/34; B65D 43/161; B65D 81/261; B65D 81/262; B65D 43/0218; B65D 25/06; B65D 85/36; A47J 47/10

See application file for complete search history.

(56) References Cited

U.S. PATENT DOCUMENTS

2019/0106314 A1* 4/2019 Shaw .................... B67D 7/005
2019/0133281 A1* 5/2019 Munie ................... A45C 11/20

* cited by examiner

FOOD CONTAINER WITH VENTS ON HANDLES

CROSS-REFERENCE TO RELATED APPLICATION

This application is a Continuation-in-Part of co-pending application Ser. No. 16/426,371 filed on May 30, 2019, which is a continuation application of U.S. patent application Ser. No. 15/377,978, filed on Dec. 13, 2016, now U.S. Pat. No. 10,351,311, issued on Jul. 16, 2019, which claims priority to Taiwanese Patent Application No. 105128688, filed on Sep. 5, 2016. The entire disclosure of which is incorporated by reference herein.

BACKGROUND OF THE INVENTION

Technical Field

The invention relates to food containers, particularly to a food container with vents.

Related Art

Food containers are usually used for holding food such as vegetable or fruit. However, when food held in a container is attached by water, deterioration or putridity of the food is easy to occur because of long-term contact with water. In addition, if vegetable or fruit is put in a container for a long time, water on the vegetable or fruit will be vaporized to condense into water droplets on an inner wall of the container. The food in the container will be spoiled soon when the water droplets fall down onto the food.

Moreover, some of currently available food containers have been provided with vents on their covers to overcome the above problem. However, a venting structure on a cover usually protrudes from a surface of the cover to cause unevenness of the cover. This makes such containers cannot be stably stacked. In addition, vents on a cover may be blocked by the food in the container, so this causes the problem on venting.

SUMMARY OF THE INVENTION

In one aspect, the invention is to provide a food container with vents on handles, which can remove moisture or prevent moisture from condensing in the box to keep the food in the box fresh.

Accordingly, the food container of the invention includes a box and a cover. The box includes a box wall and a receiving room. Two opposite sides of the box wall are provided with a pair of handle portions. An upper portion of each bent section is formed with a venting space communicating with the receiving room. The cover is removably fastened to the box and includes a cover plate, a pair of handle lids and a pair of sliding seals. The handle lids can be fixed to the handle portions to cover the venting space. Each handle lid is provided with vents. The sliding seals are separately disposed in the handle lids to be capable of selectively cloaking the vents.

In another aspect, the invention is to provide a food container with vents on handles, whose cover can make multiple food containers stably stacked on each other.

The food container of the invention provides a handle portions with a bent section. The cover plate is provided with handle lids for gripping the handle portions. The handle lid is provided with vents and a sliding seal which can selectively cloak the vents. When the sliding seal exposes the vents, moisture can flow to the outside to avoid condensation of moisture. Accordingly, food in the container can keep fresh. Further, the cover plate of the invention has a recess for being stacked by another container. This is very convenient for users.

DETAILED DESCRIPTION OF THE INVENTION

Figure 1:
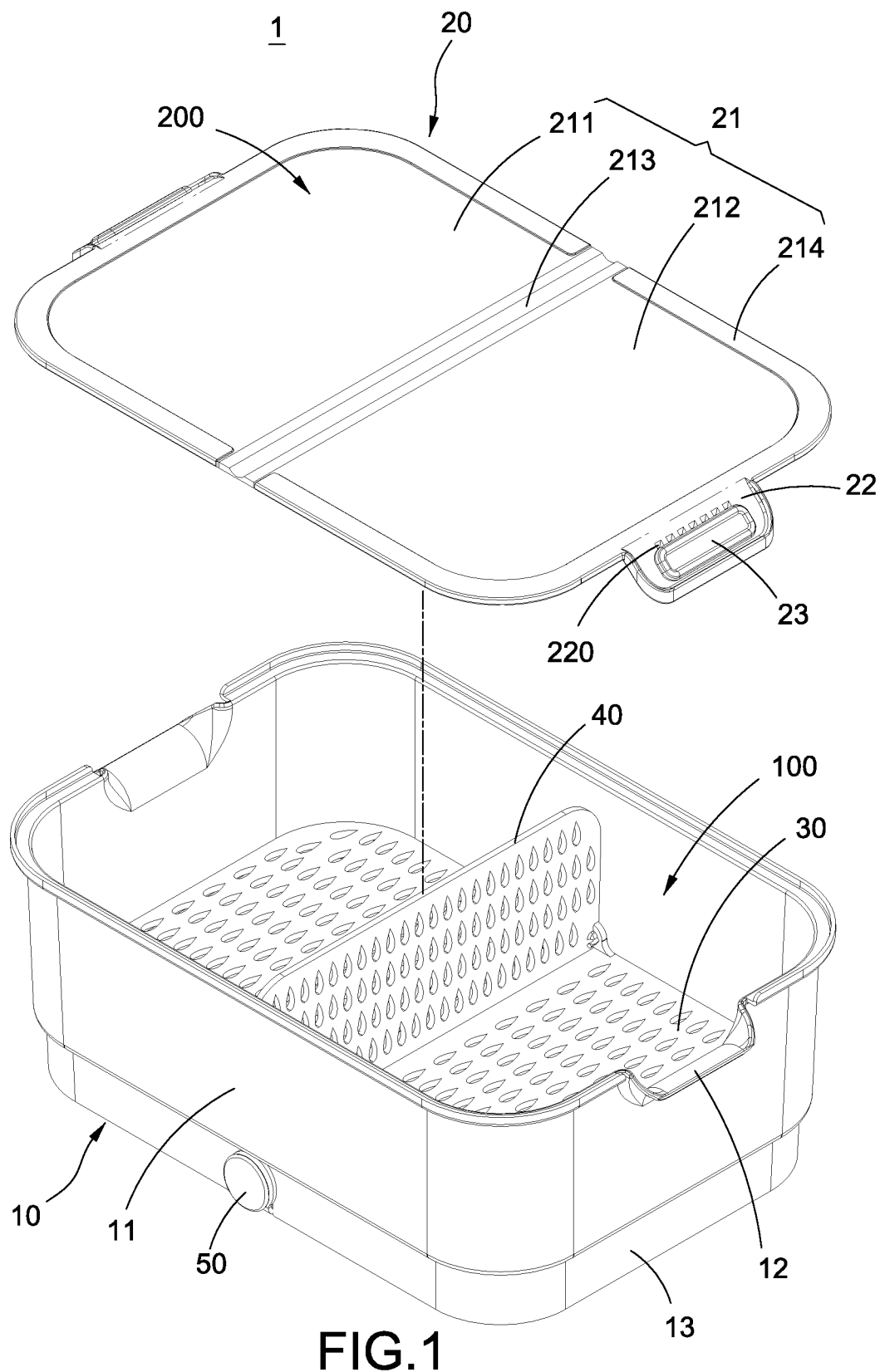
FIG. 1 is a schematic view of the food container of the invention.
Figure 2:
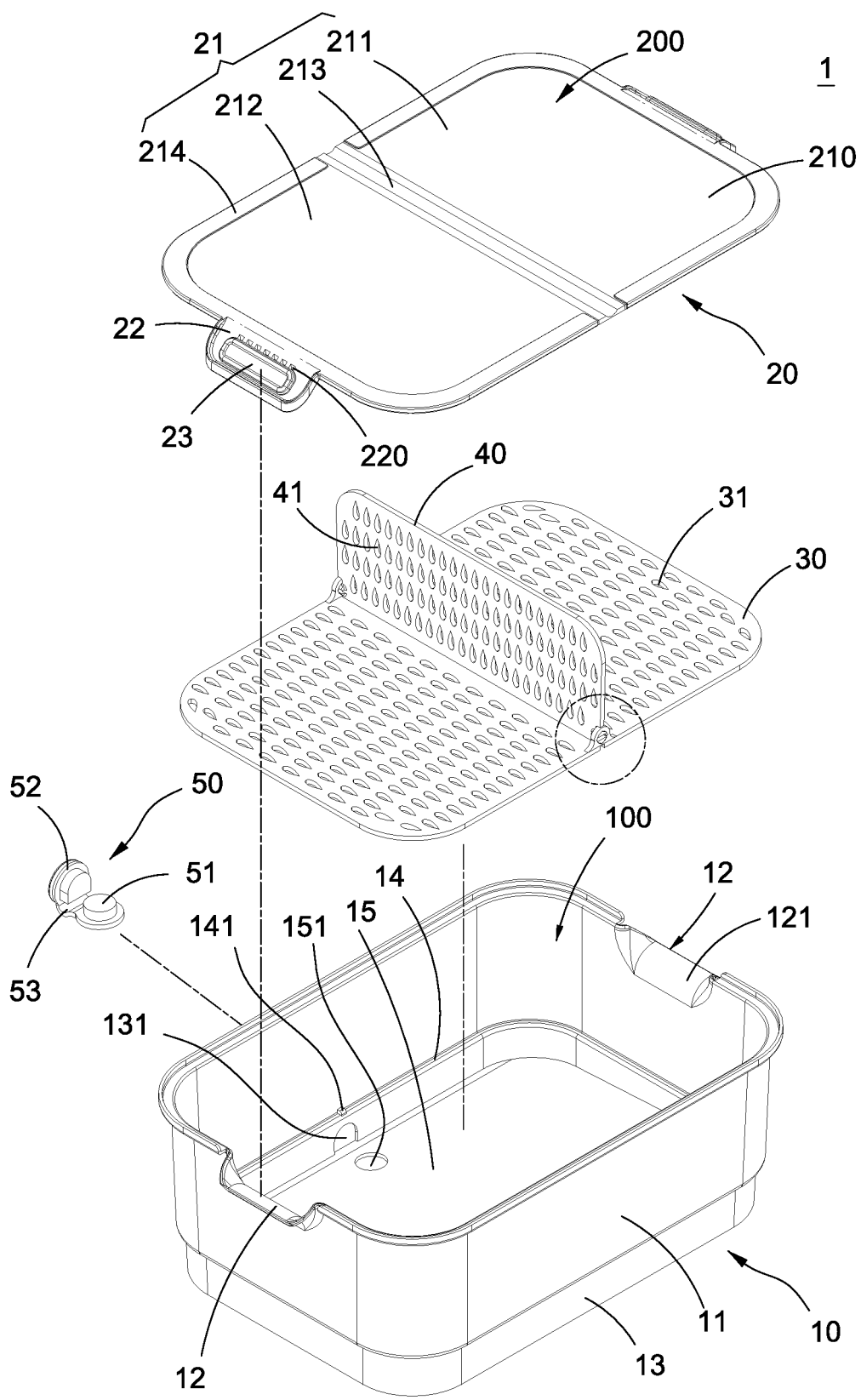
FIG. 2 is an exploded view of the food container of the invention.

Please refer to FIGS. 1 and 2, which are a schematic view and an exploded view of the food container of the invention. The food container 1 of the invention includes a box 10 and a cover 20. In an embodiment, the food container 1 further includes a loading plate 30 and a partition plate 40. The cover 20 can be removably fastened to the box 10 to constitute the food container. In addition, both the loading plate 30 and the partition plate 40 are disposed in the box 10. The details of the food container 1 will be further described below.

As shown, the box 10 includes a box wall 11 and a receiving room 100 encompassed by the box wall 11. The box wall 11 are provided with a pair of handle portions 12 at two opposite sides of the receiving room 100. Each handle portion 12 is extended with a bent section 121 from the box wall 11 toward a direction which is bent away from the receiving room 100. An upper portion of each bent section 121 is formed with a venting space 101 communicating with the receiving room 100.

The cover 20 is removably fastened to the box 10 to cover the receiving room 100. The cover 20 includes a cover plate 21, a pair of handle lids 22 at two opposite sides of the cover plate 21 and a pair of sliding seals 23. The pair of handle lids 22 corresponds to the pair of handle portions 12 in position. Each handle lid 22 extends aslant outward from a periphery of the cover plate 21. Also, the handle lid 22 is capable of being fixed to the handle portion 12 to cover the venting space 101. Each handle lid 22 is provided with vents 220 corresponding to the venting space 101. Accordingly, the pair of sliding seals 23 can be assembled on the pair of handle lids 22 to selectively cloak the vents 220.

Preferably, the cover plate 21 includes a left side plate 211, a right side plate 212 connected thereto, a flexible sheet 213 and a guard ring 214. The flexible sheet 213 connects the left side plate 211 to the right side plate 212. The guard ring 214 surrounds a surface 210 of the left side plate 211 and the right side plate 212 to form a recess 200 on the surface 210. The recess 200 is a flat for being put or stacked by another food container.

The loading plate 30 is put in the receiving room 100 and is provided with drain holes 31. The partition plate 40 is movably connected to the loading plate 30 and is also provided with drain holes 41.

Please refer to FIG. 2. The box 10 is formed with a bottom wall 13 which slightly gradually diminishes downward and located on the bottom side of the receiving room 100. The bottom wall 13 surrounds the bottom of the box 10. A step 14 is formed between the bottom wall 13 and the box wall 11. Also, the loading plate 30 is put on the step 14. Preferably, the step 14 is formed with an engaging block 141 and the loading plate 30 is formed with an engaging notch 32 corresponding to the engaging block 141. The loading plate 30 is positioned in the receiving room 100 by engagement between the engaging block 141 and the engaging notch 32.

Figure 3:
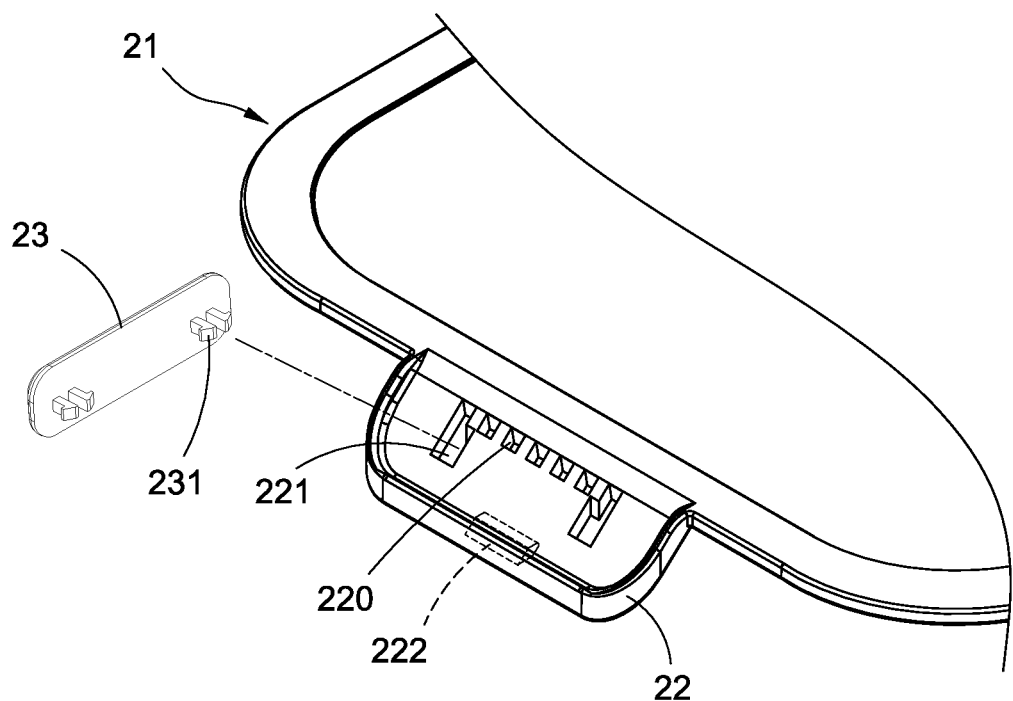
FIG. 3 is a schematic view of the handle lid and the sliding seal of the invention.
Figure 4:
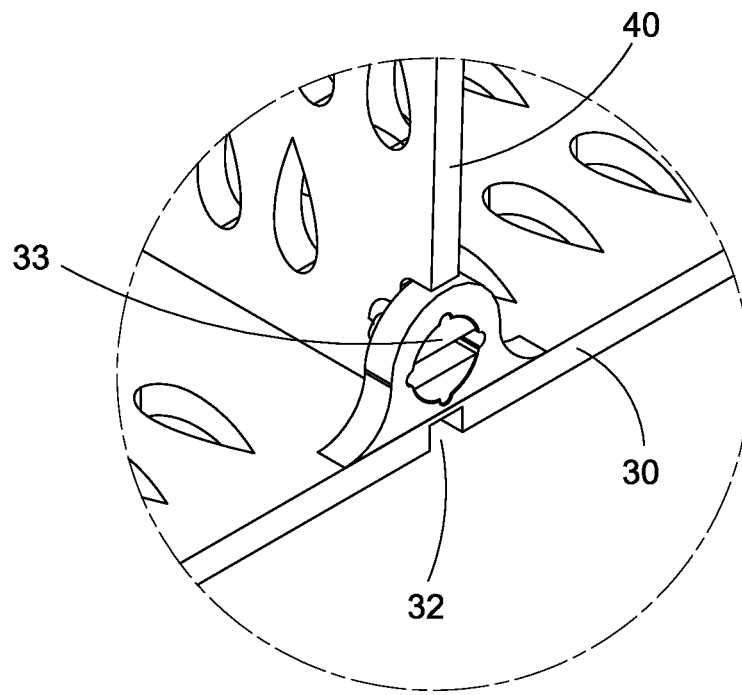
FIG. 4 is a schematic view of the loading plate connected with the partition plate of the invention.
Figure 5:
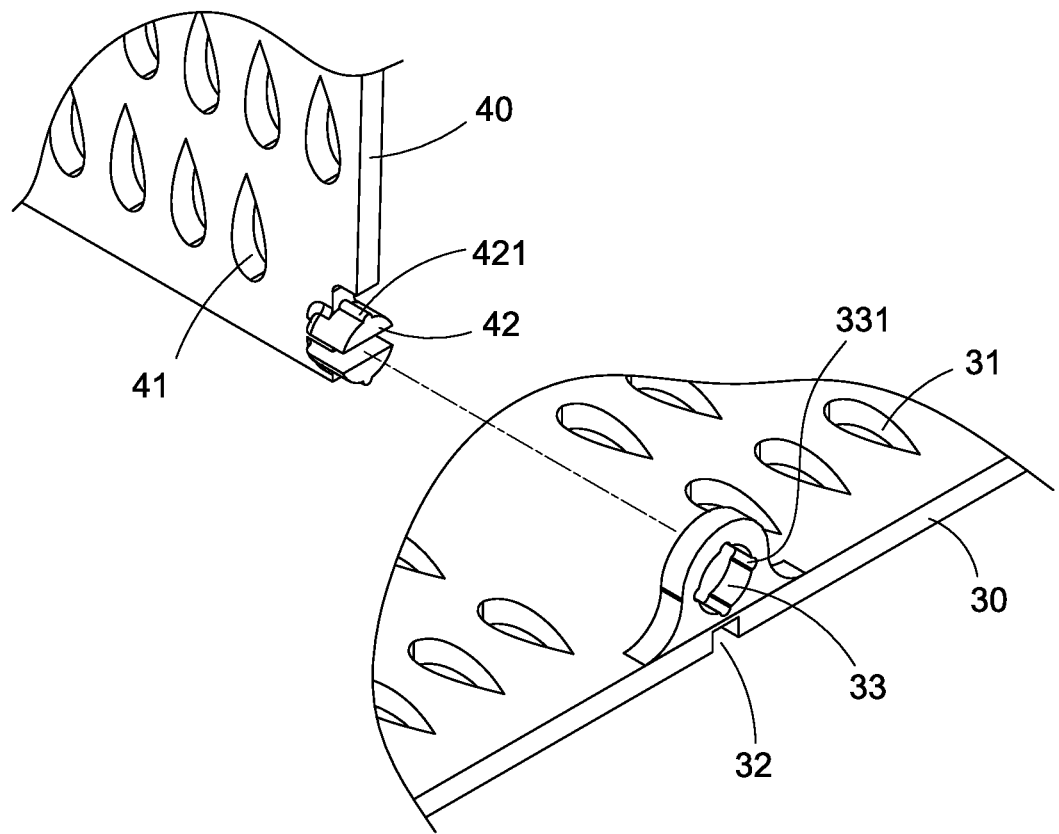
FIG. 5 is an exploded view of the loading plate and the partition plate of the invention.

Please refer to FIGS. 3-5, which are a schematic view of the handle lid and the sliding seal, a schematic view of the loading plate connected with the partition plate and an exploded view of the loading plate and the partition plate of the invention. As shown in FIG. 3, the handle lid 22 is formed with a pair of sliding slots 221 which are correspondingly located at two sides of the vents 220. The sliding seal 23 is formed with a pair of hooks 231 on the side facing the handle lid 22. The sliding seal 23 can be slid against the handle lid 22 by moving the pair of hooks 231 in the pair of sliding slots 221.

Please refer to FIGS. 4 and 5. In an embodiment of the invention, the loading plate 30 is provided with a pair of pivoting holes 33 and the partition plate 40 is provided with a pair of pivoting shafts 42. The partition plate 40 is movably connected to the loading plate 30 by inserting the pair of pivoting shafts 42 into the pair of pivoting holes 33. In detail, the pivoting hole 33 is formed with positioning grooves 331 and the pivoting shaft 42 is formed with ribs 421.

Figure 6:
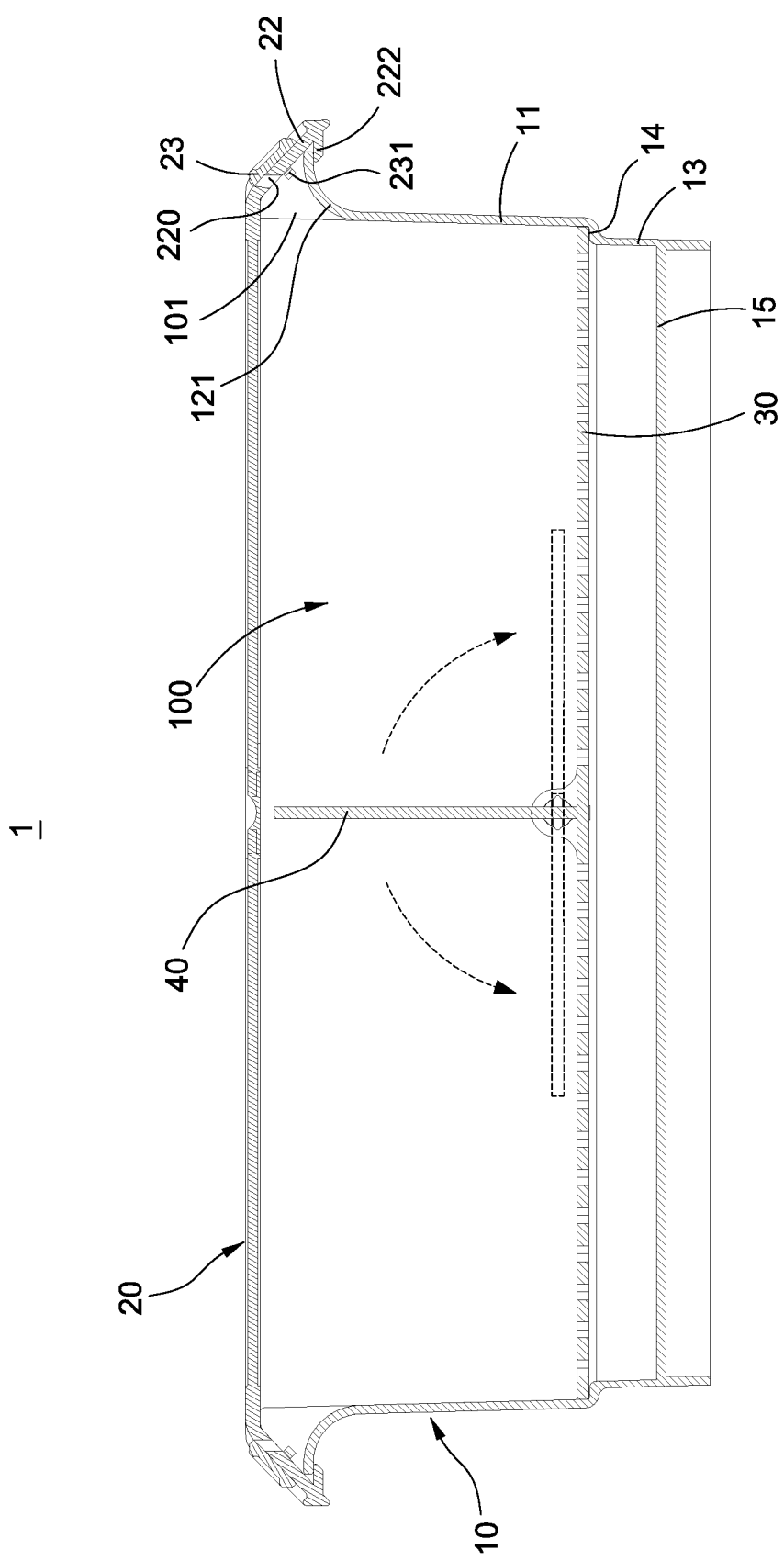
FIG. 6 is a schematic view of the partition plate which is being adjusted.

As shown in FIG. 6, which is a schematic view of the partition plate which is being adjusted, in this embodiment, the partition plate 40 can be selected to be perpendicularly or horizontally mounted on the loading plate 30 by engagement of the ribs 421 and the positioning grooves 331 to provide users options depending upon actual requirements.

Figure 7:
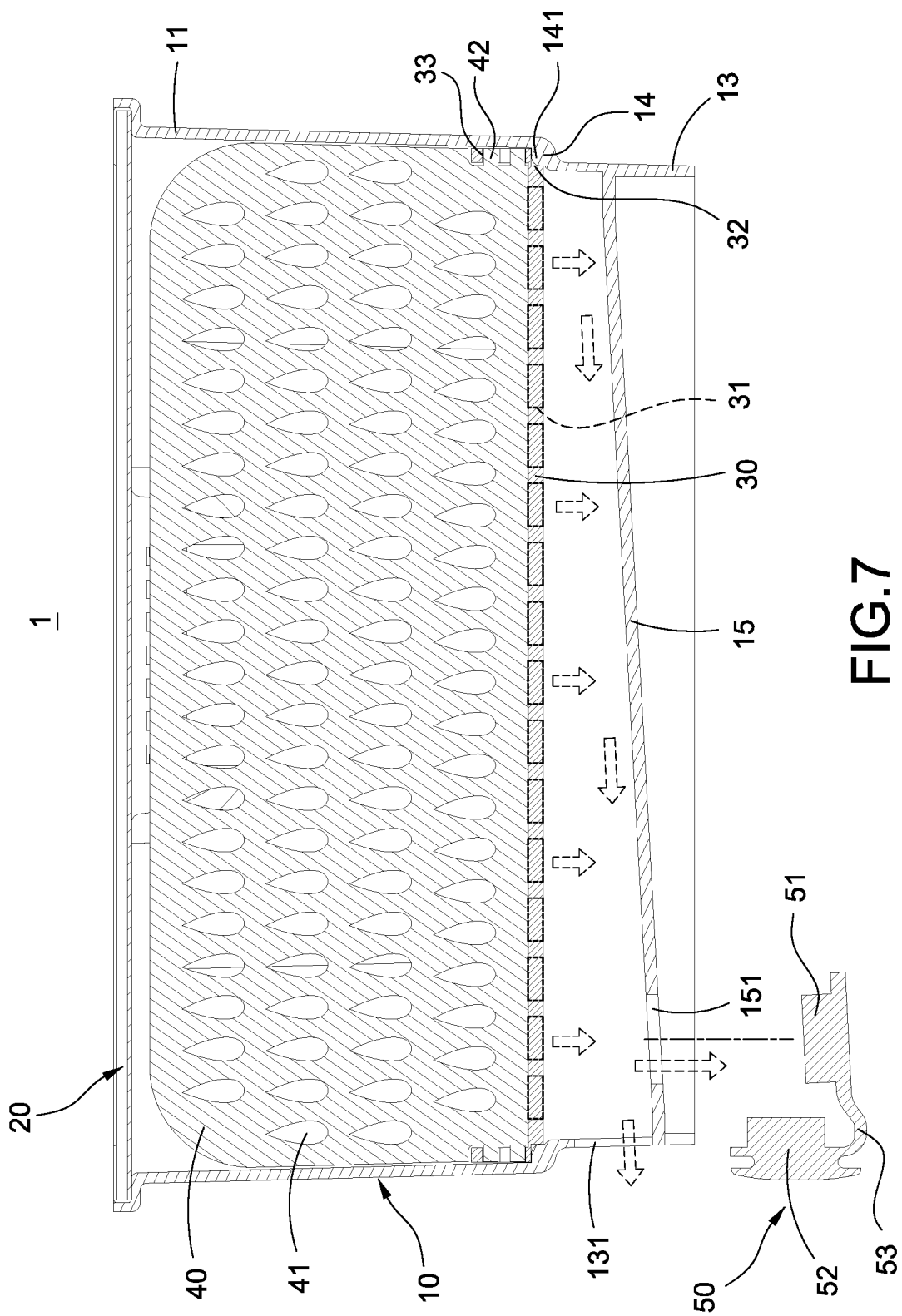
FIG. 7 is a schematic view of the food container of the invention in use.

Please refer to FIG. 7, which is a schematic view of the food container of the invention in use. In this embodiment, the box 10 is formed with a bottom plate 15 enclosed by the bottom wall 13. The bottom plate 15 downward extends from a side of the bottom wall 13 to an opposite side. The bottom plate 15 has a first water outlet 151. The bottom wall 13 is provided with a second water outlet 131 adjacent to the first water outlet 151.

In addition, the food container 1 further includes a draining cap 50. The draining cap 50 includes a first cap 51 which can be plugged into the first water outlet 151, a second cap 52 which can be plugged into the second water outlet 131 and a connecting sheet 53 connecting the first and second caps 51, 52. As a result, when vegetable or fruit is placed on the loading plate 30 in the receiving room 100, water remained on the vegetable or fruit will flow out through the drain holes 31 and fall down on the bottom plate 15. The bottom plate 15 is slant, so the water falling on the bottom plate 15 will flow to a lower position of the bottom plate 15.

In this embodiment, it is noted that the first water outlet 151 is located at the lower position of the bottom plate 15. Accordingly, when the draining cap 50 plugged into the first and second water outlets 151, 131 is removed, the water will be drained out from the first and second water outlets 151, 131.

Figure 9:
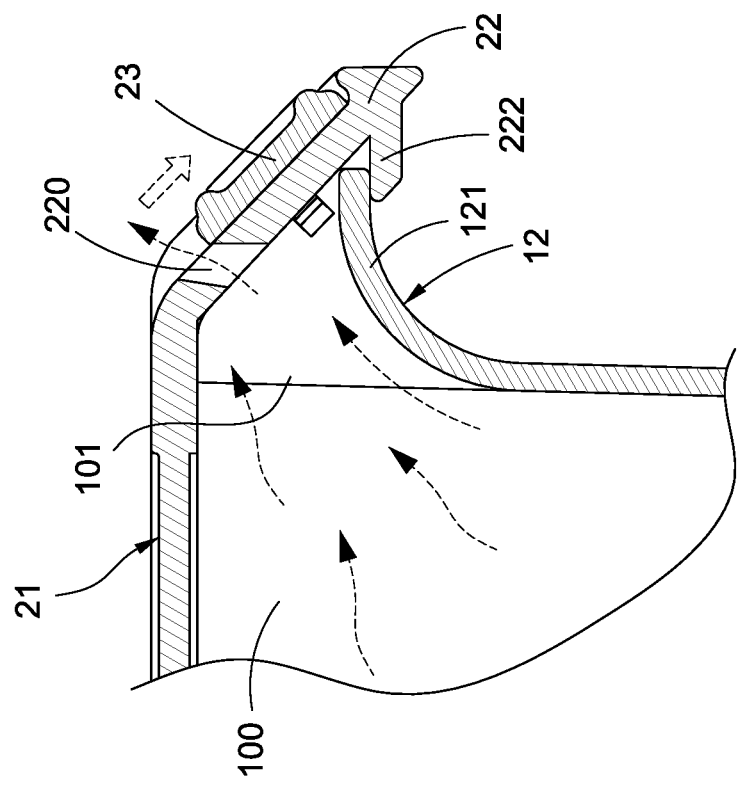
FIG. 9 is a schematic view showing moisture ejection of the food container of the invention.
Figure 8:
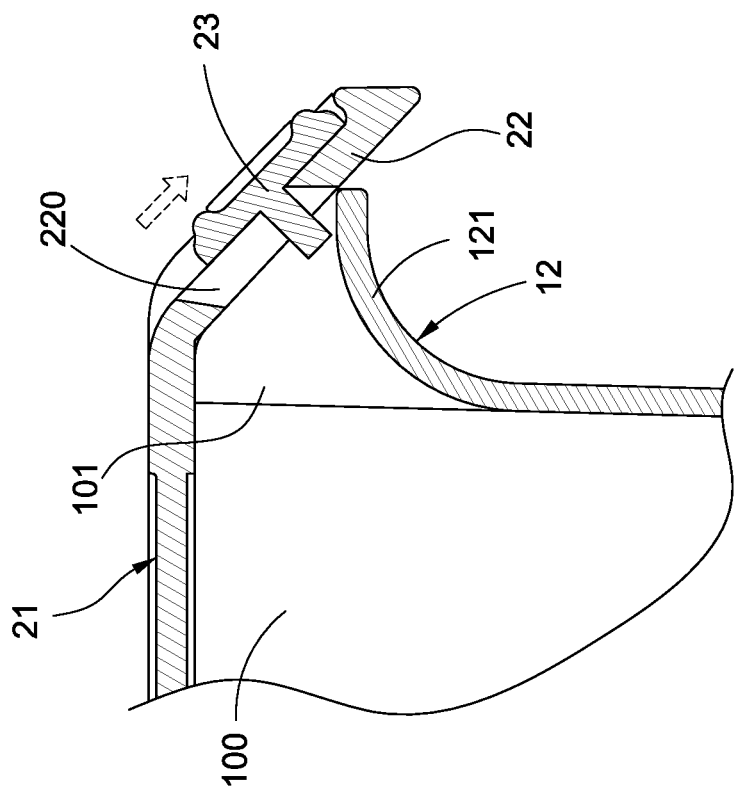
FIG. 8 is a schematic view of the sliding seal which is being moved in the handle.

Please refer to FIGS. 8 and 9, which are a schematic view of the sliding seal which is being moved in the handle and a schematic view showing moisture ejection of the food container of the invention. As shown in FIG. 8, the sliding seal 23 can be slid against the handle lid 22. The sliding seal 23 cloaks the vents 220 when the sliding seal 23 is moved upward. At this time, the receiving room 100 of the container 1 is a closed space.

In addition, please refer to FIG. 9, when the sliding seal 23 is moved downward, the vents 220 will be exposed. At this time, moisture in the receiving room 100 flows to the venting space 101 and then flows the outside through the vents 220, so that moisture condensing in the receiving room 100 can be prevented. In this embodiment, the handle lid 22 is formed with a gripping portion 222 on the side facing the box 10. Also, the cover 20 is fastened to the box 10 by gripping the handle portion 12 of the box 10 with the gripping portion 222.

Figure 10:
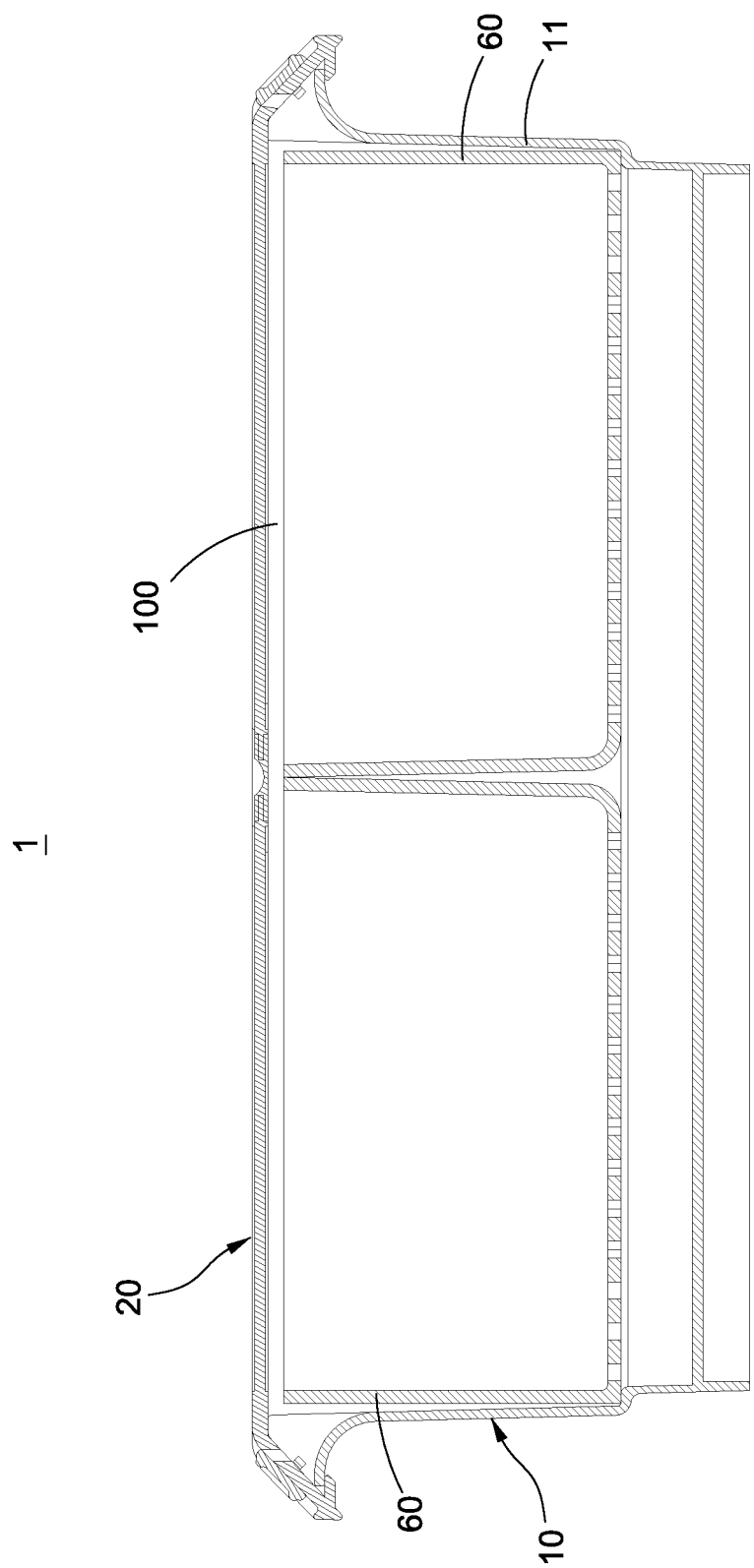
FIG. 10 shows another embodiment of division of the receiving room of the food container of the invention.

Please refer to FIG. 10, which shows another embodiment of division of the receiving room of the food container of the invention. As shown, the receiving room 100 may accommodate two draining boxes 60 to replace both the loading plate 30 and the partition plate 40.

Figure 11:
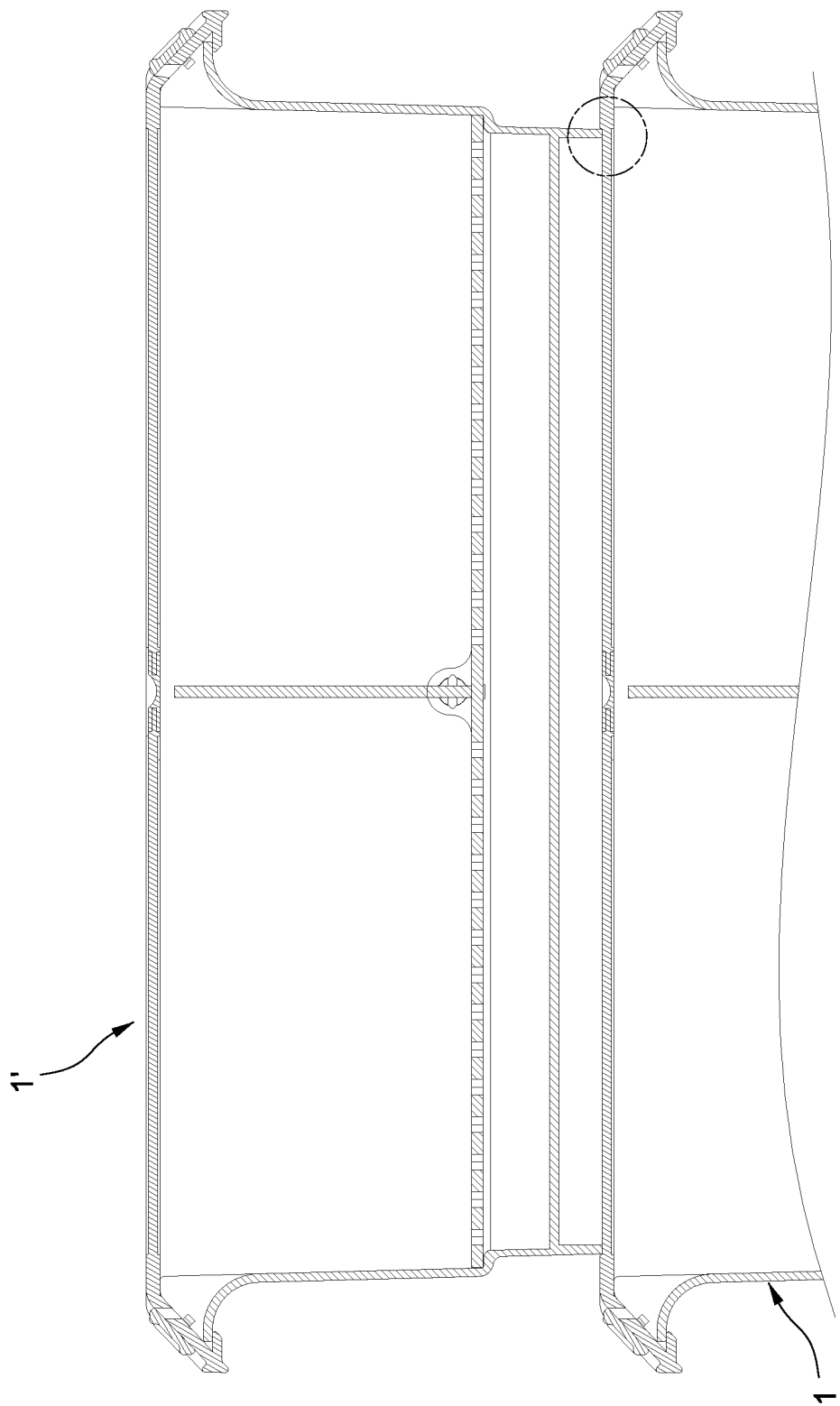
FIGS. 11 and 12 are a schematic view of another stacking manner of the food container of the invention and a partly enlarged view thereof.
Figure 12:
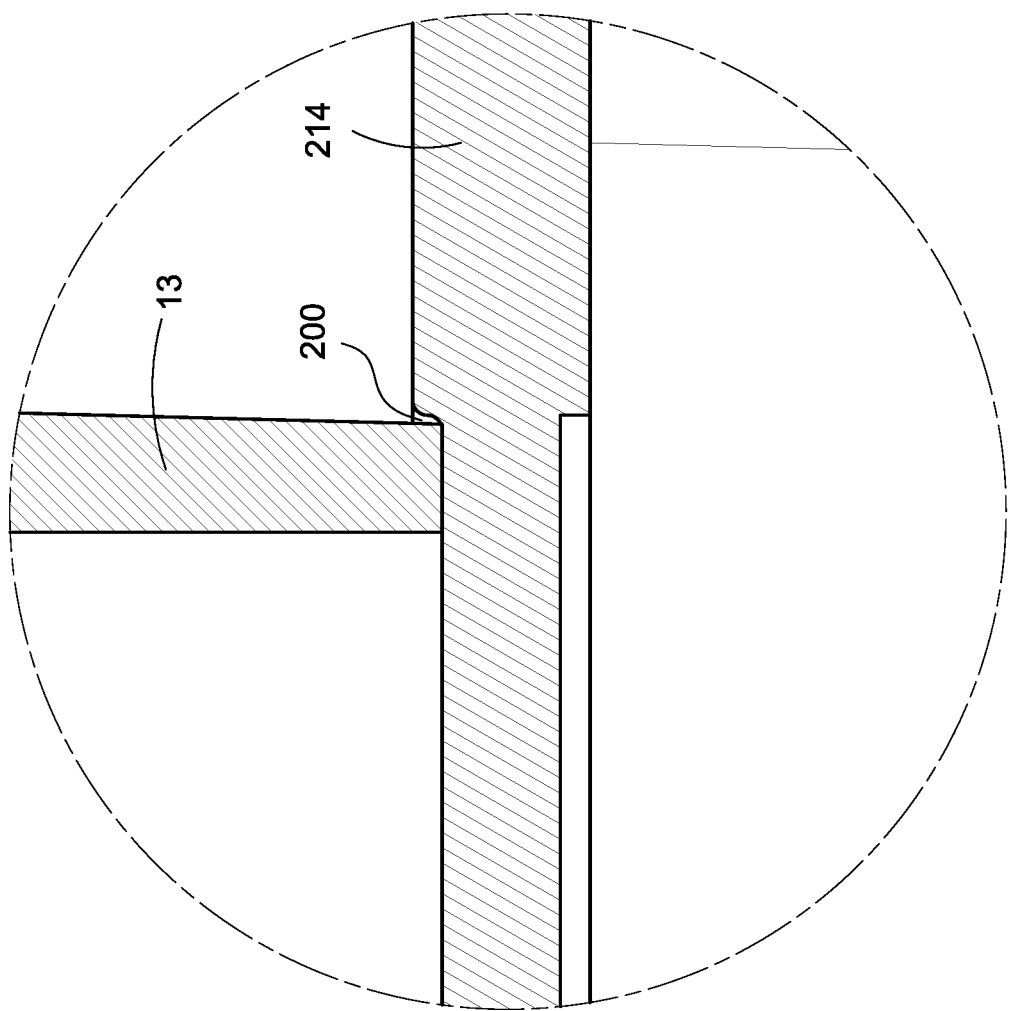

Please refer to FIGS. 11 and 12, which are a schematic view of another stacking manner of the food container of the invention and a partly enlarged view thereof. As shown in FIG. 11, the food container 1 of the invention can be stacked by another one 1' with the same type and size. In detail, as shown in FIG. 12, the cover plate 21 has the recess 200 and the bottom of the box 10 gradually diminishes downward to form a bottom wall 13. As a result, when the food container 1' is placed on the recess 200, the bottom wall 13 of the food container 1' will abut against a side of the recess 200 without shift.

Figure 13:
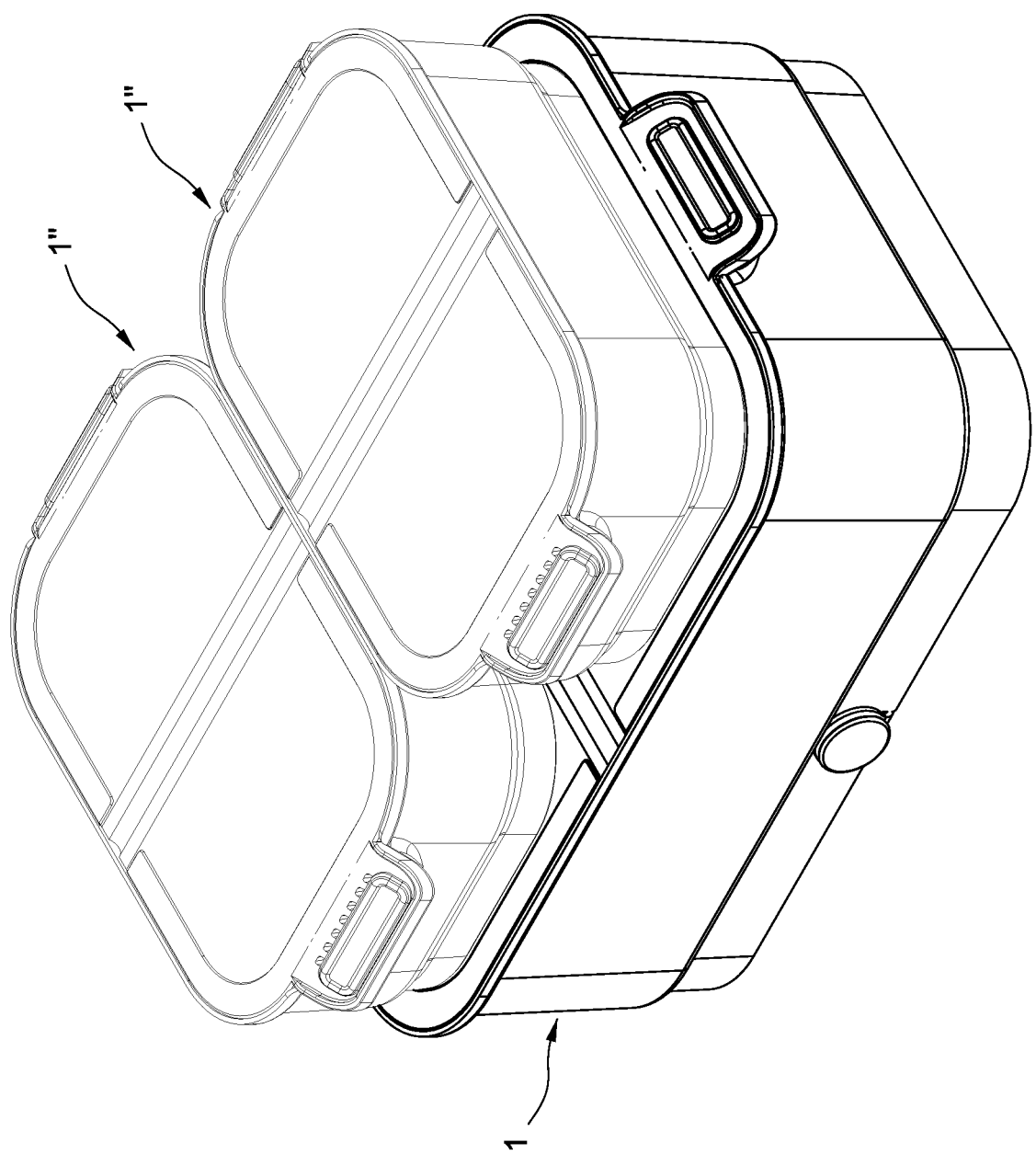
FIG. 13 shows still another stacking manner of the food container of the invention.

Please refer to FIG. 13, which shows still another stacking manner of the food container of the invention. As shown, two small food containers 1" can juxtaposed on the food container 1.

It will be appreciated by persons skilled in the art that the above embodiment has been described by way of example only and not in any limitative sense, and that various alterations and modifications are possible without departure from the scope of the invention as defined by the appended claims.

What is claimed is:

1. A food container, comprising:
   a box, comprising a box wall and a receiving room encompassed by the box wall, the box wall being provided with a pair of handle portions, each handle portion being extended with a bent section from the box wall toward a direction which is bent away from the receiving room, and an upper portion of each bent section being formed with a venting space communicating with the receiving room; and
   a cover, removably fastened to the box to cover the receiving room, comprising a cover plate, the cover plate comprising a pair of handle lids and a pair of sliding seals, the pair of handle lids corresponding to the pair of handle portions in position, each handle lid being capable of being fixed to one of the handle portions to cover the venting space, each handle lid being provided with vents corresponding to the venting space, and the pair of sliding seals being disposed in the pair of handle lids correspondingly to be capable of selectively cloaking the vents.

2. The food container of claim 1, further comprising a loading plate placed in the receiving room and a partition plate movably fastened to the loading plate, both the loading plate and the partition plate are provided with drain holes, the loading plate is provided with a pair of pivoting holes, the partition plate is provided with a pair of pivoting shafts, and the partition plate is movably connected to the loading plate by inserting the pair of pivoting shafts into the pair of pivoting holes.

3. The food container of claim 2, wherein the box is formed with a bottom wall which gradually diminishes downward from a bottom side of the receiving room, the bottom wall surrounds a bottom of the box, a step is formed between the bottom wall and the box wall, and the loading plate is placed on the step.

4. The food container of claim 3, further comprising a draining cap, wherein the box is formed with a bottom plate enclosed by the bottom wall, the bottom plate downward extends from a side of the bottom wall to an opposite side, the bottom plate has a first water outlet, the bottom wall is provided with a second water outlet adjacent to the first water outlet, the draining cap comprises a first cap which can be plugged into the first water outlet, a second cap which can be plugged into the second water outlet and a connecting sheet connecting the first and second caps.

5. The food container of claim 3, wherein the step is formed with an engaging block, and the loading plate is formed with an engaging notch.

6. The food container of claim 2, wherein the pivoting hole is formed with positioning grooves, the pivoting shaft is formed with ribs, and the partition plate is perpendicularly or horizontally mounted on the loading plate by engagement of the ribs and the positioning grooves.

7. The food container of claim 1, wherein the cover plate comprises a left side plate, a right side plate, a flexible sheet and a guard ring, the flexible sheet connects the left side plate to the right side plate, the guard ring surrounds a surface of the left side plate and the right side plate to form a recess on the surface.

8. The food container of claim 1, wherein each handle lid is formed with a pair of sliding slots, each sliding seal is formed with a pair of hooks on a side facing each handle lid, each sliding seal can be slid against each handle lid by moving the pair of hooks in the pair of sliding slots.

9. The food container of claim 1, wherein each handle lid is formed with a gripping portion on a side facing the box, and the cover is fastened to the box by gripping each handle portion with the gripping portion.

10. The food container of claim 1, wherein each handle lid extends aslant outward from a periphery of the cover plate.

11. The food container of claim 1, wherein the pair of the sliding seals is slidably assembled to the pair of handle lids.

* * * * *